(12) United States Patent  
Goldstein et al.

(10) Patent No.: US 7,028,896 B2  
(45) Date of Patent: Apr. 18, 2006

(54) TRANSACTION CARD FABRICATION CONTROL SYSTEM AND METHOD

(75) Inventors: Keith Goldstein, Framingham, MA (US); Stuart Blank, Wayland, MA (US)

(73) Assignee: Arthur Blank & Company, Inc., Boston, MA (US)

( * ) Notice: Subject to any disclaimer, the term of this patent is extended or adjusted under 35 U.S.C. 154(b) by 206 days.

(21) Appl. No.: 10/635,427

(22) Filed: Aug. 6, 2003

(65) Prior Publication Data

US 2004/0069845 A1  Apr. 15, 2004

Related U.S. Application Data

(60) Provisional application No. 60/405,243, filed on Aug. 22, 2002.

(51) Int. Cl.
*G06K 7/00* (2006.01)

(52) U.S. Cl. ............... 235/436; 235/380; 235/375; 235/379; 235/492; 235/454; 235/439; 235/493; 439/42

(58) Field of Classification Search ............... 235/436, 235/380, 375, 379, 492, 454, 439, 493; 439/42
See application file for complete search history.

(56) References Cited

U.S. PATENT DOCUMENTS

| | | | | |
|---|---|---|---|---|
| 4,348,759 A | * | 9/1982 | Schnurmann | 714/724 |
| 4,818,238 A | * | 4/1989 | Borg | 439/42 |
| 5,590,779 A | * | 1/1997 | Ramsey | 206/459.1 |
| 6,202,933 B1 | * | 3/2001 | Poore et al. | 235/493 |
| 6,467,687 B1 | * | 10/2002 | Hill et al. | 235/448 |
| 6,510,993 B1 | * | 1/2003 | Kiekhaefer | 235/439 |
| 6,719,206 B1 | * | 4/2004 | Bashan et al. | 235/492 |
| 6,769,718 B1 | * | 8/2004 | Warther et al. | 283/61 |
| 2002/0179708 A1 | * | 12/2002 | Zhu et al. | 235/454 |
| 2004/0065729 A1 | * | 4/2004 | Ranard et al. | 235/375 |

* cited by examiner

*Primary Examiner*—Karl D. Frech
*Assistant Examiner*—Allyson N Trail
(74) *Attorney, Agent, or Firm*—Wolf, Greenfield & Sacks, P.C.

(57) ABSTRACT

A system and method for producing transaction cards, such as gift cards and identification cards, ensures that duplicate and missing cards are eliminated from a group of cards. Cards may also be provided in an ordered sequence. Each transaction card may include one or more unique identifiers so that each card is uniquely identified from all other cards in the group. Cards in the group may be packaged according to a hierarchy, and the location of each card in the hierarchy may be retained and later used for identifying the location of cards and/or batch activation.

52 Claims, 7 Drawing Sheets

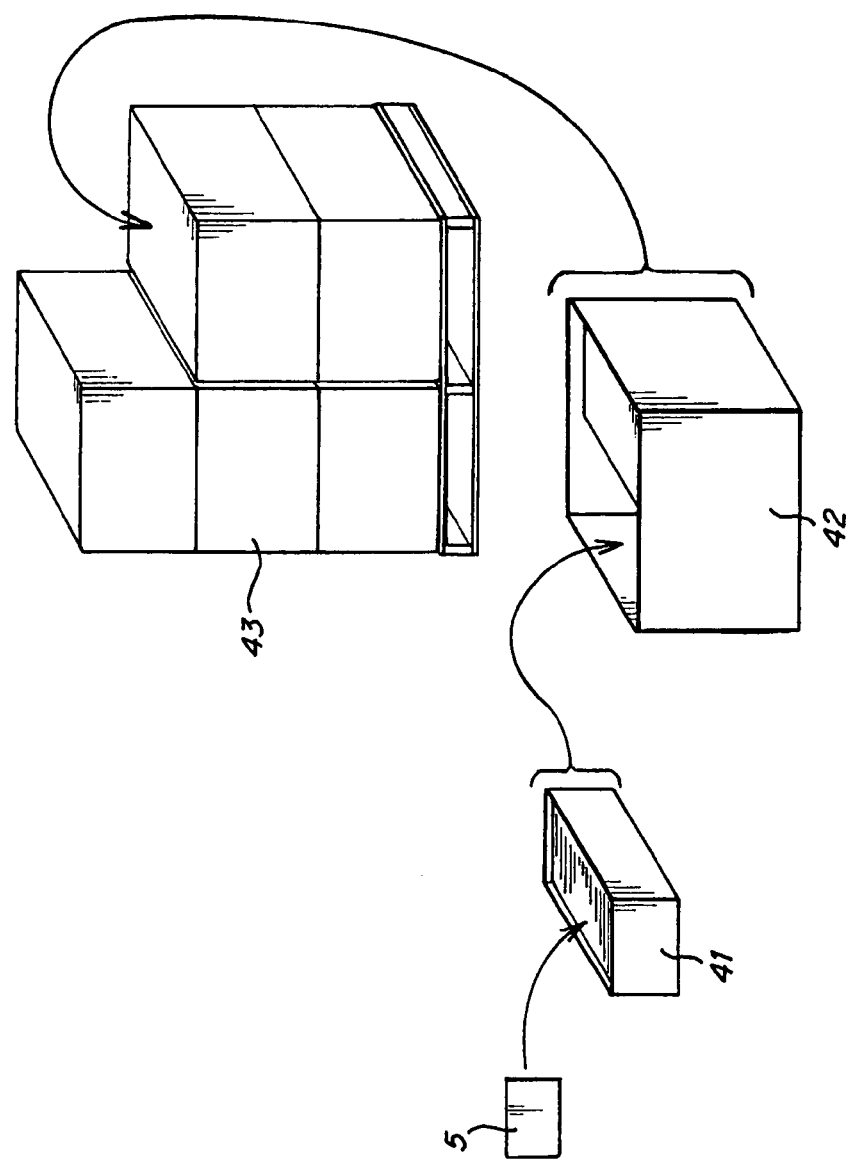

| CARD NO. | IDENTIFIER | SLEEVE | BOX | PALLET | CARD READ STATUS | SLEEVE COMPLETE | OPERATOR/ STATION | STATUS |
|---|---|---|---|---|---|---|---|---|
| 1 | A0315421 | 00001 | 0001 | 001 | 1 | NO | SMITH/2 | |
| 2 | A0325421 | 00001 | 0001 | 001 | 1 | NO | SMITH/2 | |
| 3 | A0335421 | 00001 | 0001 | 001 | 1 | NO | SMITH/2 | |
| 4 | XXXX | 00001 | 0001 | 001 | 1 | NO | SMITH/2 | |
| 5 | XXXX | 00001 | 0001 | 001 | 1 | NO | SMITH/2 | |
| 6 | XXXX | 00001 | 0001 | 001 | 1 | NO | SMITH/2 | |
| 7 | XXXX | 00001 | 0001 | 001 | 1 | NO | SMITH/2 | |
| 8 | XXXX | 00001 | 0001 | 001 | 1 | NO | SMITH/2 | |
| 9 | XXXX | 00001 | 0001 | 001 | 0 | NO | SMITH/2 | |
| 10 | XXXX | 00002 | 0001 | 001 | 2 | NO | SMITH/2 | |
| 11 | XXXX | 00002 | 0001 | 001 | 1 | YES | JONES/4 | |
| 12 | XXXX | 00002 | 0001 | 001 | 1 | YES | JONES/4 | |
| 13 | XXXX | 00002 | 0001 | 001 | 1 | YES | JONES/4 | |
| 14 | XXXX | 00002 | 0001 | 001 | 1 | YES | JONES/4 | |
| 15 | XXXX | 00002 | 0001 | 001 | 1 | YES | JONES/4 | |
| 16 | XXXX | 00002 | 0001 | 001 | 1 | YES | JONES/4 | |
| 17 | XXXX | 00002 | 0001 | 001 | 1 | YES | JONES/4 | |
| 18 | XXXX | 00002 | 0001 | 001 | 1 | YES | JONES/4 | |
| 19 | XXXX | 00002 | 0001 | 001 | 1 | YES | JONES/4 | |
| 20 | XXXX | 00002 | 0001 | 001 | 1 | YES | JONES/4 | |
| 21 | XXXX | 00003 | 0001 | 001 | 1 | NO | JONES/4 | |
| 22 | XXXX | 00003 | 0001 | 001 | 1 | NO | JONES/4 | |
| 23 | XXXX | 00003 | 0001 | 001 | 1 | NO | JONES/4 | |
| 24 | XXXX | 00003 | 0001 | 001 | 1 | NO | JONES/4 | |
| 25 | XXXX | 00003 | 0001 | 001 | 1 | NO | JONES/4 | |
| 26 | XXXX | 00003 | 0001 | 001 | 1 | NO | JONES/4 | |
| 27 | XXXX | 00003 | 0001 | 001 | 1 | NO | JONES/4 | |
| 28 | XXXX | 00003 | 0001 | 001 | 1 | NO | JONES/4 | |
| 29 | XXXX | 00003 | 0001 | 001 | 1 | NO | JONES/4 | |
| 30 | XXXX | 00003 | 0001 | 001 | 1 | NO | JONES/4 | |

Fig. 3

TRANSACTION CARD FABRICATION CONTROL SYSTEM AND METHOD

RELATED APPLICATIONS

This application claims benefit under 35 U.S.C. §119(e) to U.S. Provisional Application 60/405,243, filed Aug. 22, 2002. U.S. application Ser. No. 09/965,440 and U.S. Provisional Application 60/405,243 are hereby incorporated by reference in their entirety.

FIELD OF THE INVENTION

This invention relates to controlling transaction card fabrication.

BACKGROUND OF THE INVENTION

Transaction cards, such as gift cards, credit cards, identification cards, driver's licenses, user passes, electronic cash cards, automatic teller machine (ATM) cards, customer loyalty cards, prepaid telephone cards, and so on, are commonly manufactured using encoding and printing apparatus. For example, many types of transaction cards must be personalized, i.e., encoded, printed, or otherwise processed so that each card in a given group of cards is uniquely identified from other cards in the group. For example, transaction cards in a loyalty card program may be encoded and/or printed to carry a unique identifier such as an alpha numeric string encoded in a magnetic stripe on the card and/or printed as a barcode on the card. This unique identifier allows each card in a group of cards to be uniquely identified with a particular issuee so that future transactions made with the card can later be associated with the issuee.

Card issuers, such as merchandise retailers, typically purchase transaction cards, such as gift cards, from a manufacturer in large batches of 10,000, 100,000 or more cards. Purchasing cards in large groups can reduce the per unit cost of the cards since the manufacturer can specially configure manufacturing equipment for an extended run (instead of having to reconfigure on a more frequent basis for different, smaller jobs) and purchase stock and other materials in relatively large quantities. As a result, card issuers typically receive the cards in large groups from the manufacturer. In the case of gift cards, before the cards are issued to customers, a database or other information store must be created for the card issuer to keep track of which cards have been issued and which are in inventory, how much each account associated with each issued gift card has been credited, the identity of each issuee, and other information. Without such a database, the gift card program would be difficult, if not impossible, to implement.

SUMMARY OF THE INVENTION

The inventors have appreciated that in some cases it may be desirable for a card manufacturer to provide large groups of transaction cards to a customer so there are no unexpected, duplicate or missing cards. Unexpected cards are cards that have an identifier that was not supposed to be included on any card in the group or are cards that are mispositioned in the group. As used herein, a "duplicate" card is an unwanted card that has an identifier that matches one or more other cards in the group. For example, in some embodiments, a group of cards may include pairs of cards with the same identifier, such as when a pair of cards with the same identifier is issued to individuals in a family. In this example, each card in the pair is not a "duplicate" card as used herein because the two cards with the same identifier are desired. Rather, a third card that has the same identifier as a pair of cards in the group would be a "duplicate." Duplicate cards can be a problem for a card issuer because if two cards having the same identifier are inappropriately issued, transactions made by two different card issuees will be associated with the same account. Missing cards can be a problem because a card issuer may not be able to determine if a card has been issued and the record of issuance has been lost, if the card was stolen from inventory, or if the card was never included in the shipment from the manufacturer. Thus, providing groups of cards so that there are no unexpected, duplicate or missing cards in each group can avoid embarrassment to the card issuer in the case of a person being issued an inoperative card, two different persons being issued cards with a same identifier, wasted computer storage space requirements for missing cards, or inconvenience or wasted time in determining whether a card has been lost or stolen in the case of missing cards from the group.

In another aspect of the invention, cards in a group may be provided in a contiguous manner such that the cards are arranged in a specific sequence. This may allow a card issuer to issue cards in a particular order and know precisely which cards have been issued and which cards are still in inventory. For example, at the time of shipment from the manufacturer, transaction cards may be arranged in numerical sequence according to an identifier encoded or printed on the cards, e.g., so card no. 1 precedes card no. 2, which precedes card no. 3, and so on. Providing the cards in a specific sequence may allow for easier inventory control of the cards, batch activation of cards, and/or ensuring that undistributed cards are still under the control of the issuer.

In one aspect of the invention, a comprehensive transaction card fabrication control system can ensure that a group of cards is produced and/or packaged in multiple card sets, such as bundles or sleeves. (A sleeve is a common term used in the art to refer to sets having a relatively small number of cards, such as 100–500 cards, but as used herein is not limited to any particular number of cards. Cards within a sleeve may be grouped into yet smaller sets, commonly called bundles. Bundles may include 5, 10 or more cards.) A comprehensive audit trail may be generated during manufacture that indicates precisely which cards are included in which sleeves, allowing accurate tracking of cards, assuring that there are no unexpected, duplicate or missing cards in the group, assuring that cards in each sleeve are arranged in a particular sequence, and/or assuring that cards have been assembled from the appropriate component parts (e.g., if cards are made from two or more separate parts that are assembled together to form the card). Thus, a relatively large group of transaction cards, e.g., 1,000, 10,000, 100,000 or more cards, may be arranged in multiple sets, or sleeves, of smaller numbers of cards, e.g., 100, 200, 500 or more cards. Reports generated by the control system may allow an operator to determine exactly which cards are located in each sleeve and which component parts or other features each card may include.

In another aspect of the invention, audit information may be generated for transaction cards. Such audit information may be generated by a comprehensive transaction card fabrication control system and may include a wide variety of information including, but not limited to, information regarding the creation, packaging, shipment or other manufacture/processing of cards. For example, the audit information may include information regarding the various component parts, processes, processing stations or equipment used to perform processes used to make cards. The audit information may also include the identity of human operators responsible during processes performed on cards, information regarding how and where individual cards are packaged for shipment, the current location of individual cards, video or other surveillance of processing areas during manufacture or packaging (e.g., so the cause of errors may be more easily identified), details regarding card remaking or card identifier reading, a complete list of identifiers from all cards, and other features related to the making and shipping of individual cards or sets of cards.

Audit information may also facilitate the creation of a card tracking database or other information store since a card issuer can be assured that, at the time of shipment from a manufacturer, cards having a specific set of identifiers are included in the shipment. This set of known identifiers can be used to populate a database that is later used to manage the use of the cards, such as in the case of gift cards issued by a retailer to its customers. Packaging cards in multiple sets can be useful in other ways, such as when a customer wishes to activate a plurality of cards. For example, a customer may wish to purchase 10, 50 or more gift cards from a retailer to be given as gifts. The retailer may easily identify and activate multiple cards at one time since the cards may be provided in contiguous sets (e.g., a bundle, sleeve, etc.) of cards and/or in a known sequence. As a result, the retailer may retrieve an entire set or a smaller series of cards in a set and activate all of the cards at once without having to individually activate each card. That is, since the cards provided in a particular set or series within a set may be known from the audit information, all of the cards in a desired set or series may be easily identified such as by identifying the bundle, sleeve or other set to the card activation system. For example, a card tracking database may include not only the identifiers for a set of gift cards, but also the bundles, sleeves, boxes, etc. in which each card is included. To activate a bundle, sleeve, etc. of cards, the database can be updated to activate those cards associated with the selected bundle, sleeve, etc. To activate a smaller series of cards within a selected bundle, sleeve, etc., the first and last cards in the series may be identified to the card tracking database, and since the cards are organized in a specific sequence known to the database, all cards located in the set between the first and last identified cards in the series may be activated.

In one aspect of the invention, a transaction card fabrication control system includes a card reader that reads an identifier from each of a plurality of transaction cards in a group where the identifier uniquely identifies each transaction card from other transaction cards in the group and facilitates an association of a transaction involving each transaction card with an issuee. A card transport moves transaction cards relative to the card reader, and a card presence sensor detects the presence of transaction cards moved by the card transport. A controller compares identifiers read from transaction cards by the card reader to a stored list of identifiers for the transaction cards and generates an approval report to release the transaction cards for packaging only if all identifiers read from the transaction cards match corresponding identifiers in the stored list.

In one aspect of the invention, a method for controlling transaction card fabrication includes providing a group of fabricated transaction cards each having at least one identifier formed on the card that uniquely identifies the card from others in the group of transaction cards. The group of transaction cards is logically organized into a plurality of sets of transaction cards. Identifiers are read from the plurality of sets of transaction cards, and the identifiers read from each set are compared to a stored list of identifiers associated with the set. A determination is made whether the identifiers read from transaction cards in each set match corresponding identifiers in the stored list associated with the set. A report is generated that indicates a set is complete if all identifiers read from the set match a corresponding identifier in the associated stored list, and a report is generated that indicates a set is incomplete if at least one identifier read from the set does not match a corresponding identifier in the associated stored list.

In one aspect of the invention, a method for controlling transaction card fabrication includes automatically identifying a plurality of components that are to be assembled together to form at least one transaction card. An automatic verification is also made for each transaction card that appropriate components are to be assembled together before the components are assembled, and the plurality of components are assembled to form at least one transaction card after verifying that the assembled plurality of components are appropriate for assembly.

In one aspect of the invention, a method for controlling transaction card fabrication includes:

(a) providing a group of fabricated transaction cards, each transaction card having at least one identifier formed on the transaction card that uniquely identifies the transaction card from others in the group of transaction cards;

(b) machine reading identifiers from a set of the transaction cards, the set of transaction cards having 5 or greater transaction cards and less than a total number of transaction cards in the group;

(c) physically organizing the set of transaction cards to be separately packaged from other sets of transaction cards;

(d) storing the identifiers read from the corresponding set of transaction cards;

(e) repeating steps (b) through (d) for subsequent sets of transaction cards;

(f) comparing the identifiers read from the sets to a stored list of identifiers; and (g) automatically identifying if any transaction cards in the sets are not expected, duplicates or if there are any missing transaction cards based on the comparison of step (f).

In one aspect of the invention, a method for controlling transaction card fabrication includes:

(a) moving a first transaction card along a path;

(b) performing a first operation on the first transaction card that alters the first transaction card, the first operation, when properly performed, forming information on the first transaction card and causing the first transaction card to be uniquely identified from other transaction cards in a group of processed transaction cards;

(c) detecting information indicative of whether the first operation was properly performed on the first transaction card;

(d) automatically remaking the first transaction card if the first operation was improperly performed on the first transaction card before making a next transaction card so that the set of processed transaction cards is created in a specific sequence;

(e) repeating steps (a) through (d) so as to provide a group of transaction cards, each transaction card having at least one identifier formed on the transaction card that uniquely identifies the transaction card from others in the group of transaction cards;

(f) machine reading identifiers from a set of the transaction cards, the set of transaction cards having 5 or greater transaction cards and less than a total number of transaction cards in the group;

(g) physically organizing the set of transaction cards to be separately packaged from other sets of transaction cards;

(h) storing the identifiers read from the corresponding set of transaction cards;

(i) repeating steps (f) through (h) for subsequent sets of transaction cards;

(j) comparing the identifiers read from the sets to a stored list of identifiers; and (k) automatically identifying if any transaction cards in the sets are not expected, duplicates or if there are any missing transaction cards based on the comparison of step (j).

These and other aspects of the invention will be apparent and/or obvious from the following description.

BRIEF DESCRIPTION OF THE DRAWINGS

Illustrative embodiments in accordance with the invention are described below with reference to the follow drawings in which like numerals reference like elements, and wherein:

FIG. 2 shows an exemplary packaging hierarchy that may be used in accordance with the invention;

FIG. 3 shows an example database table for use in accordance with the invention;

DETAILED DESCRIPTION

Figure 1:
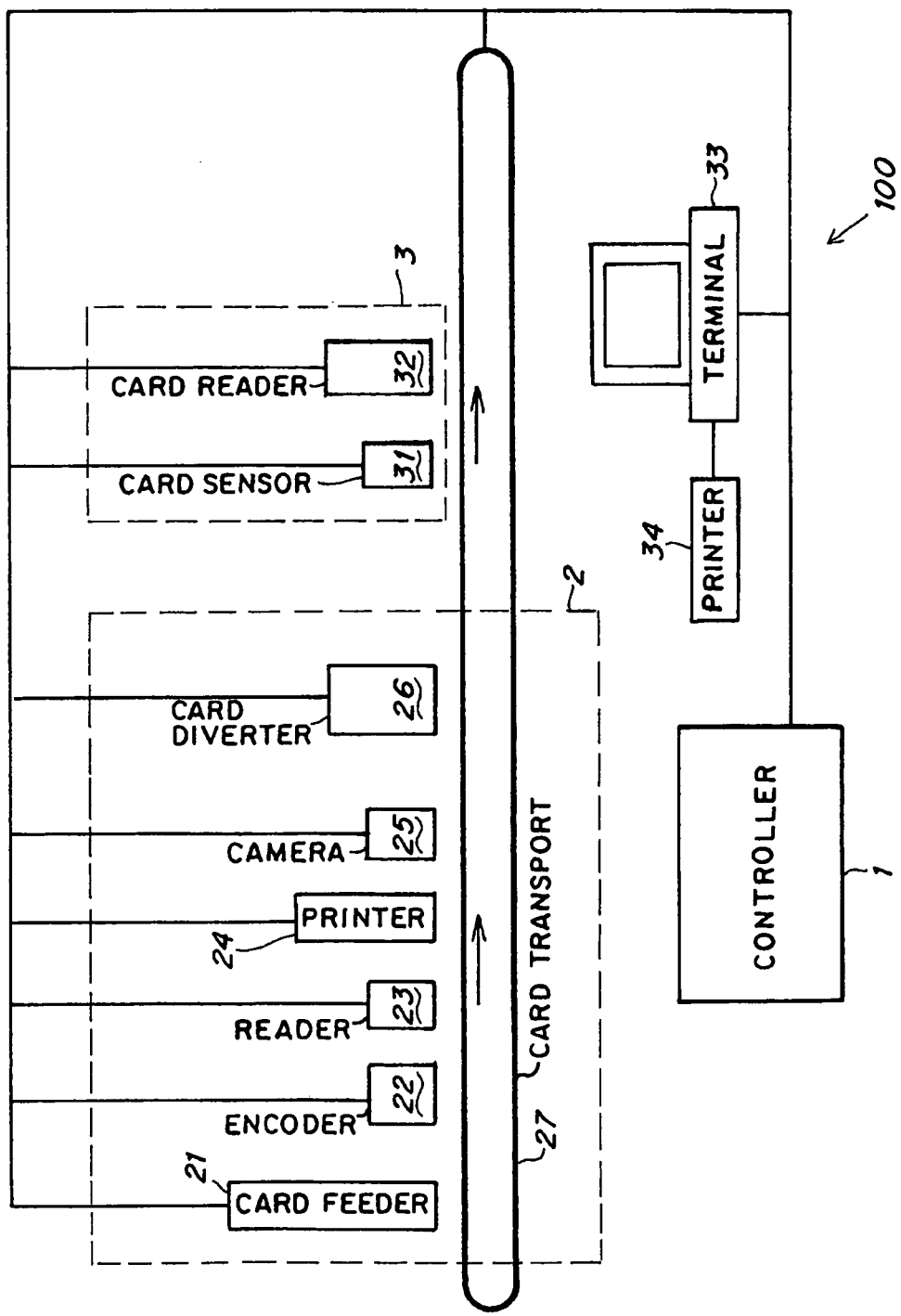
FIG. 1 is a schematic block diagram of a first embodiment in accordance with the invention.

Aspects of the invention provide a comprehensive card control and/or auditing system that can allow a card manufacturer to make and package transaction cards so the cards are provided in a particular arrangement, whether in a specific order, without unexpected or duplicate cards, and/or without missing cards. Control of the card production can be made at any suitable point in manufacturing, such as from the first processing steps or any point thereafter. For example, production of each card in a group may be tracked from initial assembly of printed sheets or other card parts, or after cards in the group are personalized (i.e., provided with an identifier or other information that makes each card in the group unique from other cards in the group). Information regarding the tracking of card production may be stored for later reference. For example, if a card issuer for some reason wished to determine exactly which sleeve or box a particular card is in out of a set of 10, 100 or more sleeves or boxes, a database may be used to identify the exact sleeve or box in which the card was shipped. The tracking information may be used to generate a report that indicates that cards in a group have been checked and are appropriately packaged. For example, identifiers from cards in a sleeve may be read and checked against a database to ensure that there are no unexpected, duplicate or missing cards or that the cards are sequenced properly. Once it has been verified that there are no unexpected, duplicate or missing cards, or the cards are sequenced properly, a report may be generated indicating that the sleeve is ready for final packaging and shipment to a customer.

Alternately, specifics about the creation of cards may be determined. For example, a serial number of a computer chip incorporated into a particular card may be identified, or other specific parts used to create the card may be identified. Such an auditing trail may allow a customer to identify which cards include a defective or inappropriate component. Those cards may be identified, removed from the group and replacement cards made. Other uses for such audit or tracking information will occur to those of skill in the art.

Various aspects of the invention are described below in connection with an illustrative embodiment of a transaction card fabrication control system 100 shown in FIG. 1. In this illustrative embodiment, a transaction card fabrication control system 100 includes a card manufacturing apparatus 2 that generates transaction cards. The processes performed by the manufacturing apparatus 2 may vary from actually making cards from raw stock material in sheets, printed, gathered, laminated, and punched into individual cards, to finishing operations, such as personalization, performed on prefabricated cards. In this embodiment, the manufacturing apparatus 2 performs finishing operations on cards by encoding and/or printing unique identifiers on the cards, but it should be understood that the manufacturing apparatus 2 may perform other functions.

The system 100 also includes a verification system 3 that may read the cards to determine information on the cards, such as an identifier encoded in the cards, information printed on the cards, etc. As is discussed in more detail below, the verification system 3 may be used to ensure that cards are made and packaged properly before shipment to a customer or other use of the cards.

In this illustrative embodiment, the system 100 has a controller 1 that may communicate with the card manufacturing apparatus 2 and/or the card verification system 3 to control operation of the system 100 and/or provide information to an operator. The controller 1 may be, or include, one or more general purpose computers including any suitable software and/or other components to perform the desired input/output or other functions. The controller 1 may include a terminal 33 that provides an operator local control of the manufacturing apparatus 2 and/or the verification system 3 under the overall, system-level control of the controller 1. The terminal 33 may include user input devices, such as a keyboard, mouse, barcode scanner, magnetic strip reader, an electronic chip reader, touch screen or other devices to allow an operator to provide input to the terminal 33 or the controller 1. A printer 34, video monitor or other display may provide output information to the user, including printed hard copy reports, processing status information, or other information. It should be understood that the controller 1 need not be linked to both the manufacturing apparatus 2 and the verification system 3 as shown in FIG. 1. Instead, the controller 1 may be linked only to the verification system 3, and the manufacturing apparatus 2 may be physically separate and controlled by a different system. Thus, control of the manufacturing apparatus 2 and the verification system 3 need not be integrated under a single controller 1.

The card manufacturing apparatus 2 may use any suitable process or combination of processes to generate the cards. In this illustrative embodiment, the manufacturing apparatus 2 may produce a plurality of cards in a group, i.e., a plurality of transaction cards which are all related to each other. Cards in a group may be related to a particular job or customer, such as a batch of loyalty cards or gift cards for a particular grocery or retail store. Of course, other types of groups of cards may be made, such as driver's licenses and other identification cards, user passes, electronic cash cards, ATM cards, credit cards, prepaid phone cards, etc. Cards may be processed by the manufacturing apparatus 2 so that each card includes an identifier that is unique to the card and distinguishes the card from others in the group. The identifier may take any suitable form whether visible or invisible to the human eye, such as an alpha numeric string encoded in a magnetic stripe or printed on the cards with a human visible or invisible mark, a barcode printed on each card with a human visible or invisible mark, biometric information associated with the card, information stored in an electronic memory or chip on the card, etc.

A unique identifier for each card can be important to the use of the card in some cases, such as when the cards are used to uniquely identify the card user or account associated with the card. For example, when a gift card is purchased, the card is associated with an account that is credited with funds equal to the amount purchased by the customer (the amount may be stored on the card or in a separate computer system). Thus, the identifier is useful when activating and/or deactivating an account associated with a gift card. In addition, the unique identifier on the card may allow the merchant to identify the specific account associated with the card during a later transaction so funds in the account can be used to make a purchase. Without a unique identifier, the card may not easily be used to identify a particular account apart from other accounts associated with other gift cards. In the case of a loyalty card, credit card or identification card, the card may be used to uniquely identify the card holder or verify the holder of the card is authorized to use the card. For example, biometric data included in the card may be used to verify that the card holder is properly associated with the card.

In one aspect of the invention, a pair of uniquely associated identifiers on a card may be used to authenticate the card. In one embodiment, a pair of unique identifiers on a driver's license or other identification card can be used to trace and track both valid and invalid cards made with authorized or unauthorized stock. For example, driver's licenses may be made from card stock that includes a unique identifier incorporated into the card, e.g., by an encrypted code in an electronic memory, an imprinted alphanumeric sequence, a barcode or other marking in a machine readable infrared or ultraviolet ink or dye, etc. When each driver's license is made, a second unique identifier may be formed on the card, such as the driver's license number printed on the card. The association of the two unique identifiers on each card may be stored together in an appropriate list (e.g., motor vehicle department computer database) so that the authenticity of the driver's license can be later determined. For example, on checking the authenticity of a driver's license, a police officer may provide both unique identifiers on the proffered license, and a check of the database may reveal whether the two identifiers on the license are correctly associated together. If so, the license may be presumed valid. Fake licenses may be identified because the maker of a fraudulent license cannot know which two identifiers should be included on the license without access to the database information or the authentic license. That is, although a fraudster may know a particular person's driver's license number, address, and other information, the fraudster is unlikely to know the unique identifier that is formed on the person's authentic license. As a result, the fraudulent license will not have the two appropriate unique identifiers on the license, and the fake can be identified. This technique also prevents a fraudster from using stolen driver's license card stock from making licenses that appear genuine. That is, although the stolen stock may have a unique identifier formed in the card and can be used to make an authentic looking driver's license, the fraudster will likely not have the proper matching of both unique identifiers on the license. As a result, even fake licenses made using stolen, authentic stock can be identified by a comparison of the two unique identifiers found on a license to the motor vehicle department computer database. The two identifiers used on a card may include one identifier that is invisible to the naked eye, such as in the form of an invisible barcode, an infrared or ultraviolet read identifier, an encrypted computer code or alphanumeric string, etc. This may help prevent a fraudster from determining at least one identifier on a card by a casual review of the card.

Cards processed by the manufacturing apparatus 2 in this illustrative embodiment are supplied by a card feeder 21 that places cards onto a card transport 27, such as a conveyor belt. As the cards are moved by the card transport 27, an encoder 22 may encode a unique identifier, such as an alpha-numeric string, along with other optional information on the magnetic strip of the cards. Of course, if information is stored on the cards in forms other than in a magnetic strip, such as in an electronic chip, in biometric form, or other, the encoder 22 may include any appropriate device and/or process to encode such information. Details regarding the operation of the encoder 22 and other portions of the manufacturing apparatus 2 are not provided as these operations are well understood by those of skill in the art. A reader 23 may read the encoded magnetic strip or other information stored on each card, e.g., to ensure that the information has been properly encoded. For example, if the identifier "1234" is encoded in a card's magnetic strip, the reader 23 may read the magnetic strip after encoding to ensure that the proper identifier has been encoded.

In addition to or in place of information encoded by the encoder 22, a printer 24, such as an inkjet printer, a laser marking apparatus, embossing device, or other suitable device for marking the cards, may print a barcode or other unique identifier on the cards. Information printed by the printer 24 may match information encoded on the magnetic strip. For example, a unique alpha numeric identifier may be both encoded in the magnetic strip and printed in barcode form on the cards. A camera 25 may image the information marked on the cards by the printer 24 to ensure that the cards have been properly marked. Improperly processed cards, such as cards that are improperly encoded, printed or otherwise processed, may be removed from the card transport 27 by a card diverter 26, e.g., a gate or other device that physically removes cards from the transport 27. Cards removed from the transport 27 may be cycled back to be reprocessed, or discarded. (Although the verification system 3 is shown downstream of the diverter 26, the verification system 3 may be positioned upstream of the diverter 26 so that improperly made cards identified by the verification system 3 can be cycled back to the manufacturing system 2 and remade, if appropriate.)

Once cards are made by the manufacturing system 2, the cards may be processed to ensure that the cards were properly made, are ordered in a desired sequence, include no unexpected, duplicate or missing cards and/or are organized and packaged in a desired way. In this illustrative embodiment, the verification system 3 may be used by the controller 1 to ensure the cards are properly made and packaged. Although the verification system 3 may include any suitable device(s) to read identifiers from cards and perform other desired functions, in this illustrative embodiment, the verification system 3 includes a card sensor 31 and a card reader 32 that receive cards on the card transport 27 downstream of the manufacturing apparatus 2. The card sensor 31 may operate to sense cards as they pass on the transport 27, e.g., to trigger reading of an identifier on a card by the card reader 32. The card sensor 31 may also indicate the presence of an unreadable or unread card as opposed to a missing card if the card reader 32 fails to read an identifier from a card or if the card does not include a readable identifier. That is, without the card sensor 31, if the card reader 32 fails to read a card, the system may not be able to determine that a card was actually present but not read or if no card was present at all. Such information regarding missing or misread cards may be valuable since improperly formed cards may be removed, reread or remade by the manufacturing apparatus 2, and missing cards may be located or remade.

Information read from the cards by the verification system 3 may be used by the controller 1 to ensure the cards are arranged in a desired way. In one aspect of the invention, the cards may be organized in a hierarchy for packaging, and the location of cards in the hierarchy may be verified and controlled. Since the total number of cards typically produced in a group may be quite large (10,000,100,000 or more cards), the use of a hierarchy may break a large card group into sets of a more manageable size. For example, one illustrative packaging arrangement schematically shown in FIG. 2 has individual cards 5 packaged in sets, or sleeves 41, which are packaged in boxes 42 which are grouped on pallets 43. Before or during packaging, each card may be associated with a particular sleeve 41, box 42 and pallet 43 so that a particular card may be located later if necessary. Individual cards may be associated with a particular sleeve/box/pallet based on the card's identifier or other information, and the card/sleeve association information stored so that a detailed audit trail for cards in the group is maintained. Such an audit trail may allow the system 100 to ensure that there are no unexpected, duplicate or missing cards in the group, and allow an operator to determine exactly which cards are located in which sleeve. This information may be useful, for example, if one or more sleeves are lost, stolen or damaged so replacement cards can be made, or particular cards deactivated. Each level in the hierarchy may have any suitable number of components, e.g., each sleeve may have 5–500 or more cards, each box may have 2 or more sleeves, and each pallet may have 2 or more boxes. In addition, the hierarchy may have any suitable number of levels each with any suitable name or structure, not only three in the sleeve/box/pallet format as in this illustrative embodiment. For example, each sleeve may include one or more bundles of cards with each bundle including two or more cards.

Association of cards with each level in a packaging hierarchy may be made in different ways. For example, the hierarchy and each card's association in the hierarchy may be established before any cards are made so the manufacturer can know beforehand exactly in which sleeve, box, pallet, etc. a particular card will be shipped and can verify before shipment that all cards are appropriately packaged. Such an arrangement may also allow the packaging of different types of cards on a same pallet, box, or sleeve. For example, a customer may be ordering three different types of gift cards in $10, $50 and $100 denominations from the same manufacturer. This type of arrangement is typically referred to as "multi-lot packaging" since different types of cards are purposely packaged together. As one example, the customer may wish to have the different types of cards shipped together on the same pallet on a periodic basis so it can be continuously supplied with cards of all denominations. Alternately, the hierarchy may be established as the cards are made and packaged. That is, as cards are arranged into sets and the presence of individual cards in each set is verified, sets may be packaged for shipment without concern for particular placement in the hierarchy. Instead, the controller 1 may track the location of each card and store information regarding the association of each card with each sleeve, box, pallet, etc. The controller 1 may use a database, table or other information store (hereinafter generically referred to as a "list" or "stored list") to keep track of each card's location in the hierarchy.

If the hierarchy is established before cards are made, the manufacturing system 2 may be controlled to produce cards according to a list that defines what cards are to be included in each sleeve or other selected level in the hierarchy. For example, the manufacturing system 2 may be controlled to make cards so that contiguous sleeves of cards are output. Referring to the FIG. 1 embodiment, the cards in each sleeve may be produced on the transport 27 one after the other in a contiguous fashion and supplied to the verification system 3. As cards for a particular sleeve are output by the manufacturing apparatus 2, the cards in the sleeve may be read by the verification system 3 to determine that each card has been properly made and is properly associated with the sleeve. To check the integrity of cards in a sleeve, the identifiers read from each card by the verification system 3 may be compared to a list of identifiers stored by the controller 1. The stored list may be created before the cards are read by the verification system 3 and include information regarding all of the cards, their identifiers and other information. As each identifier read from a card is located in the stored list, a database or other store of information may be updated to indicate that a card with the identifier has been read and is associated with a particular sleeve, e.g., the sleeve being processed by the verification system 3 when the identifier was read. As a result, each particular card read by the verification system 3 may be associated with a particular sleeve for later reference. In one embodiment, the system 100 may also ensure that all identifiers in the stored list are properly associated with one and only one card by checking each identifier read from each card in the group against the stored list. If two cards are read having the same identifier, the system 100 may indicate the problem to an operator or otherwise take corrective action to eliminate the duplicate card(s). In other embodiments, cards may be manufactured so two or more cards may purposely have the same identifier, e.g., when issuing two credit cards to persons in the same family. In such a case, the system 100 may ensure that there are only two cards with the same identifier, and identify other cards have the same identifier or otherwise having an unexpected identifier. Improper cards may be pulled from the sleeve and placed in an appropriate sleeve or discarded. Similarly, the system 100 may indicate if there are missing cards from the group, or from particular sleeves.

Problems may be indicated to an operator and/or the system may itself take corrective action to correct the error.

Comparison of identifiers read from cards for a sleeve may involve a check that the cards are arranged in a sequence that matches a sequence defined in a stored list or in some other way. For example, the stored list may include a list of identifiers and the order in which cards bearing the identifiers are to be present in a sleeve. Identifiers read from cards in a sleeve may be compared in the order they were read to the identifiers in the list to ensure that the cards are properly ordered. Sequencing may be verified based on any suitable information, not just identifiers on the cards. For example, each card identifier may be associated with a particular customer name. The cards may be sequenced so that the cards are in alphabetical order based on the name associated with the card (but not necessarily printed or otherwise included on the card). Thus, for example, a card having the identifier "205676" and associated with "Brown, Mary" may precede a card having the identifier "000121" and associated with "Smith, John."

Confirmation that the cards are in a proper sequence in a sleeve or otherwise properly arranged in a packaging hierarchy may be provided by a report generated by the system 100. For example, a label having an adhesive backing may be printed and adhered to a sleeve of cards to indicate the sleeve number, the range of cards included in the sleeve, the customer, a job description, and any other suitable information. The label may be used to provide a "tamper-evident seal" for the sleeve and indicate that the sleeve is complete and ready for shipment, storage or other use. The label may include a machine-readable marking, such as a bar code, that can be read to verify the location of the sleeve, e.g., to verify it is located in a particular box or on a particular pallet, etc. Alternately, if a sleeve is not complete, a label may be prevented from being printed, preventing shipping of an incomplete sleeve. Completed sleeves of cards may be placed in appropriate boxes and these boxes may be placed on appropriate pallets, e.g., in accordance with a predefined hierarchy. The association of sleeves with boxes and pallets may be stored by the controller in the list for later use. The association of sleeves, boxes, pallets, etc. may be verified, as mentioned above, by detecting a machine readable mark on each sleeve, box, pallet, etc. and storing the detected association information. This audit information may be used in a variety of ways, such as in a "live" data feed to a customer that is provided by a data transmission line, e.g., a telephone connection, or other means, such as the Internet, wireless communication system, etc. In this way, a customer may have updated information regarding which cards have been produced, boxed, shipped, etc., as well has have detailed information regarding which cards are/should be present in particular sleeves/boxes/pallets or other packaging arrangements. The customer may use this information for card distribution and/or audit purposes, such as to instruct shipment of particular card sleeves to different locations.

To further illustrate various aspects of the invention, an exemplary card production process is described using the system 100 of FIG. 1. It should be understood that aspects of the invention are not limited to this specific example or to the system 100 in FIG. 1. In this illustrative embodiment, a group of cards including a total of 100,000 cards is produced by the system 100. The cards are logically organized into a hierarchy having 10,000 sleeves, with 10 cards per sleeve, 10 sleeves per box and 10 boxes per pallet. Of course, the number of cards in each sleeve, the number of sleeves in a box and the number of boxes on a pallet may be changed. For example, the number of cards per sleeve in a typical arrangement might be 100–500 cards, but 10 cards/sleeve is used in this example for clarity and ease of reference. Additionally, the packaging arrangement is not limited to sleeves, boxes and pallets as other arrangements are possible.

As discussed above, information representing the card organization into the packaging hierarchy may be stored by the controller 1 in a list, such as in a database or any other suitable form. FIG. 3 shows an illustrative stored list (in this case a table) that may be used by the controller 1 to manufacture and/or verify the integrity of the cards and their packaging. Although the stored list in this embodiment is in a kind of flat file database form, the stored list may be part of a relational database or any other suitable type of information store. A stored list may be populated with card information before cards are manufactured, and then used to control manufacturing and packaging. A pre-production scan of the stored list may be performed in which the identifiers in the stored list are compared to identifiers for all previous jobs for the same customer. Such a pre-production scan may identify duplicate identifiers across different jobs, allowing the manufacturer to avoid creating cards with the same identifier as cards that have already been shipped to a customer. Alternately, the stored list may be completely or partially empty and populated as cards are made by the system.

In this illustrative example, the table includes a Card No. column in which an arbitrary card number may be indicated. This card number may be used as a shorthand or otherwise easier way to reference particular cards in the group or in selected sleeves since card identifiers may be relatively long alpha numeric strings with apparently random sequencing. In this example, card numbers start at 1 and increment up to a total number of cards in the group, but other card numbering or other reference schemes may be used. Card numbers may be used to sequence cards, if desired, so cards are organized in sleeves in number order.

This illustrative table also includes an Identifier column including the identifier for each card number. The identifier may be any suitable alpha numeric string or other information that uniquely identifies each card from other cards in the group. This unique identity of each card may allow the identifier to be used in associating particular transactions with an issuee of the card. For example, if the transaction card is a customer loyalty card, purchases made using the card may be associated with the person or other issuee of the card. If cards include two identifiers, as in the driver's license example above, the table may include two Identifier columns.

The table in FIG. 3 also includes a Sleeve column for indicating the associated sleeve for each card. In this example, card numbers 1–10 are associated with sleeve "00001," card numbers 11–20 are associated with sleeve "00002," and so on. Again, any suitable numbering or other identification of sleeves may be used. The Box and Pallet columns indicate the box and pallet with which the card is associated. Like the sleeve information, the box and pallet information may not be populated in the list before card manufacture or packaging, but instead may be added to the table as cards are located in sleeves, sleeves are placed in boxes and the boxes are placed on pallets. For example, after a sleeve is formed and its integrity is found to be sound, the sleeve may be placed in any open box being prepared for shipment. The identity (e.g., a number) of the box into which the sleeve is placed may then be entered into the table (e.g., by laser scan of a bar code on the box, radio frequency identification or other means), followed by the pallet identity once the box is placed on a pallet ready for shipment. Additional fields or columns may be added if the hierarchy is expanded. For example, a "Truck" column may be added so that the truck on which a pallet is loaded for shipment may be included in the list. The table may also be adjusted to accommodate the packaging of cards from different jobs and/or different customers on a same pallet. This type of arbitrary grouping may allow tracking of cards even during shipment to different customers or locations.

The example table also includes a Card Read Status column for indicating whether a card having the identifier has been read by a verification system 3. That is, information in this column may indicate whether the identifier read from a card matches a corresponding identifier in the FIG. 3 table. For example, cards may be read by the verification system 3 one sleeve at a time and the identifiers read from cards within the sleeve compared to identifiers associated with the sleeve from the table. For example, cards in sleeve "00001" may be read and the identifiers obtained from the cards compared to the identifiers in the FIG. 3 table for all cards in sleeve "00001." If a card read in the sleeve has an identifier that matches one in the table, a "1" value or any other suitable value may be entered into the table to indicate that a card having the corresponding identifier has been read for the sleeve. In this example, card nos. 1–8 read for sleeve "00001" have identifiers matching identifiers in the FIG. 3 table as indicated by the "1" value in the Card Read Status column. However, card 9 which has a "0" value in the Card Read Status column, indicates no card has been read to have an identifier matching that in the table. Card 10, which has a "2" value in the Card Read Status column, may have actually had two cards read in the sleeve having the identifier associated with card no. 10. This problem may have occurred because of a reading or data transmission error (e.g., the magnetic stripe on card no. 9 was misread), or because there were two cards read having the identifier corresponding to card no. 10 and no card read having the identifier for card 9. Since an error has been detected in reading cards for sleeve "00001," a "No" indication may be entered in the Sleeve Complete column of the table. Thus, sleeve "00001" is not ready for packaging or shipment to a customer. Any attempt by an operator to finalize the packing of this sleeve may be blocked by the controller 1 until the error is rectified. Of course, if a card in a sleeve is read as having an identifier that does not belong in that sleeve (in the case of a mislocated card), or in any sleeve (in the case of a card having an unexpected identifier), an appropriate indication, such as a "3" value in the Card Read Status column, may be recorded in the table. The controller 1 may notify the operator that the mislocated or unexpected card has been identified, and prompt the operator to move the card to the appropriate sleeve or remove the card altogether. If desired, an additional column may be added to the table to indicate which sleeve(s) the erroneous card/identifier pair was read in so the card can be retrieved. For example, if the verification system 3 is currently reading sleeve "00002" and reads a card having an identifier that is associated with sleeve "00001," the table may be updated to indicate the improper read in the Card Read Status column and the sleeve "00002" where the erroneous card is located indicated in the table as well.

The comparison can also check the sequence of cards in the sleeve against the stored list. For example, as the cards in sleeve "00001" in FIG. 3 are read, the identifiers read from each card may be compared to the identifiers in the table to ensure that the cards are in the appropriate order, e.g., from Card No. 1 to Card No. 10. Such a comparison may be performed in real time as each identifier in the sleeve is read from actual cards, e.g., the identifier read from Card No. 1 compared to the identifier in the list for Card No. 1 immediately after the identifier is read. Alternately, a temporary file may be built that stores the identifiers read from cards in the order in which the identifiers were read for cards in the sleeve. If a temporary file is built, the temporary file may be compared to the stored list of identifiers for the sleeve. For example, a temporary file of identifiers read from cards in sleeve "00001" may be generated as the cards are read. Once the cards in the sleeve have been read, the identifiers in the temporary file may be compared, in the order that the identifiers were read, to the identifiers in the FIG. 3 table. Such a comparison can assure that not only all cards with appropriate identifiers are included in a particular sleeve, but that the cards are arranged in a particular sequence in the sleeve. The temporary file may be used in any suitable way, but in one embodiment, a temporary file may be inserted into a database including the stored identifiers. Once the temporary file is inserted into the database, the comparison between the identifiers in the temporary file and the identifiers previously stored in the database may be performed. If an error is detected, the system may identify the error so the error may be corrected, e.g., by an operator. Once the error is corrected, the sleeve of cards may be reread by the verification system 3 to ensure that the error was, in fact, corrected and that the sleeve is appropriately arranged.

The table also may include any other suitable information, such as Operator/Station or Status information as shown, or information regarding components used to make each card, whether the sleeve has been packaged, shipped, or otherwise processed, or a manufacturing history or other audit trail for the cards. In one embodiment, manufacturing operations may be videotaped as the cards are made and packaged. This video may be stored, and the table may include information that allows an operator to identify which portion of the video recorded the occurrence of an error. For example, the table may include information regarding the date, time and location that a particular card or set of cards was read, verified and/or packaged. If an error is identified with the card or set of cards, an operator may refer to the stored video corresponding to the date, time and location in the table associated with the problem card or cards to identify the source of the error.

Using the table of FIG. 3 or similar information, the controller 1 may instruct the card manufacturing apparatus 2 to make sleeves of cards in a contiguous fashion so the verification system 3 can read the identifiers of the cards for each sleeve. For example, the controller 1 may instruct the verification system 3 to begin processing when a particular sleeve of cards has been output by the manufacturing apparatus 2. (Alternately, the controller 1 may initiate reading of cards in a sleeve by the verification system 3 with input from an operator, e.g., via the terminal 33.) Before beginning, the system 100 may check to see if the sleeve has been previously read, and prevent reading or require supervisor intervention before proceeding. Such security can help prevent errors in sleeve entry into the terminal 33 and inappropriate rereading of sleeves.

After the identifiers are read from cards in a sleeve, an operator may manually initiate the identifier comparison for each sleeve integrity check. For example, after cards for a sleeve have been read by the verification system 3, the cards may be gathered and placed in a tray or other container. The operator may identify the sleeve by reading an identifier for the first and last cards in the sleeve, e.g., using a terminal's hand-held bar code reader, magnetic stripe reader or electronic chip reader that reads the identifier from the cards, and instruct the system to begin the comparison for the sleeve that begins and ends with the identifiers read manually. This comparison may involve the comparison of identifiers from a temporary file for the sleeve to identifiers in another stored list. (Alternately, the user may manually enter the sleeve number to initiate the integrity check. However, manually reading the first and last cards may help ensure that the appropriate sleeve is being processed.) After the processing is complete, the system 100 may indicate whether the sleeve is complete or not, i.e., whether there is a missing, unexpected or duplicate card in the sleeve, the cards are out of sequence, etc., and the operator may take the appropriate action to rectify any errors or package a complete sleeve. Duplicate or unexpected cards may be identified and removed from the sleeve. Missing cards may be remade and replaced. Misread cards may be manually read by the operator, and if the reread results in the card being properly identified and associated with the sleeve, the sleeve may be released for packaging.

Card identifiers need not be logically organized into sleeves before cards are read by the verification system 3. For example, the FIG. 3 table may be initially created with the Sleeve column empty. As cards are read in particular sleeves and their identifiers matched to those in the table, the sleeve in which the card and identifier is read may be indicated in the Sleeve column. This approach allows the association of cards to sleeves to be created "on the fly" while allowing the controller 1 to ensure there are no unexpected, duplicate or missing cards from a group of cards. For example, the list may be checked to determine if there are two entries in the list with the same identifier. Association of sleeves to boxes, pallets or other levels in the packaging hierarchy may also be made "on the fly". For example, sleeves may be placed in any open box and the box identified to the system 100, e.g., by reading a barcode label, radio frequency tag or other identification information for the box. The system 100 may then associate the identity of the box with the sleeve (as well as with each individual card). Similar association of boxes with pallets, etc. may also be made.

If any error is detected in reading cards in a sleeve and the problem is corrected, the sleeve may be read again in its entirety to ensure that the sleeve is complete and the problem has been corrected. That is, all of the cards in the sleeve may be provided to a card feeder and supplied to be read again, in order, by the verification system 3 and the card identifiers checked against a stored list. (Re-reading of entire sleeves may be performed using a system like that in FIG. 4 described below that is separated from a manufacturing system.) Once a sleeve is complete, the system 100 may generate an approval report that indicates one or more sleeves have been read as complete. For example, the printer 34 may print a label or other printed report that is associated with a corresponding complete sleeve of cards. This report may indicate the sleeve, card numbers or card identifiers included in the sleeve, or other information and may be required to release the sleeve for shipment to a customer. The report also may be stored electronically for future reference if necessary. An approval report may not be generated if an error is detected in reading cards in a sleeve. Instead, the system 100 may generate no report at all, or generate an error report or reject report that details the problem detected by the system 100. Similarly, once boxes, pallets or other levels in the hierarchy are complete, a report such as an adhesive label printed with the box/pallet identifier, etc. may be generated and affixed to the box/pallet/etc.

Such a report can provide a clear visual indication that the sleeve/box/pallet/etc. is ready for shipment. Failures at any stage of the verification process may be logged so that problems in the system 100 may be identified. For example, if a failure log shows that a particular card reader 32 is repeatedly misreading cards, the reader 32 may be repaired or replaced.

As a further check, the verification system 3 may optionally include a card counter such as an optical card counter or other device that counts the cards assembled in a sleeve to ensure that the proper number of cards are included in the sleeve. For example, if a sleeve should have 100 cards, an optical card counter may scan the cards assembled in a sleeve and determine the number of card in the sleeve, e.g., by detecting the number of card edges. If more or fewer than 100 cards are detected, the sleeve has an inappropriate number of cards and an operator may have to take corrective action.

Figure 4:
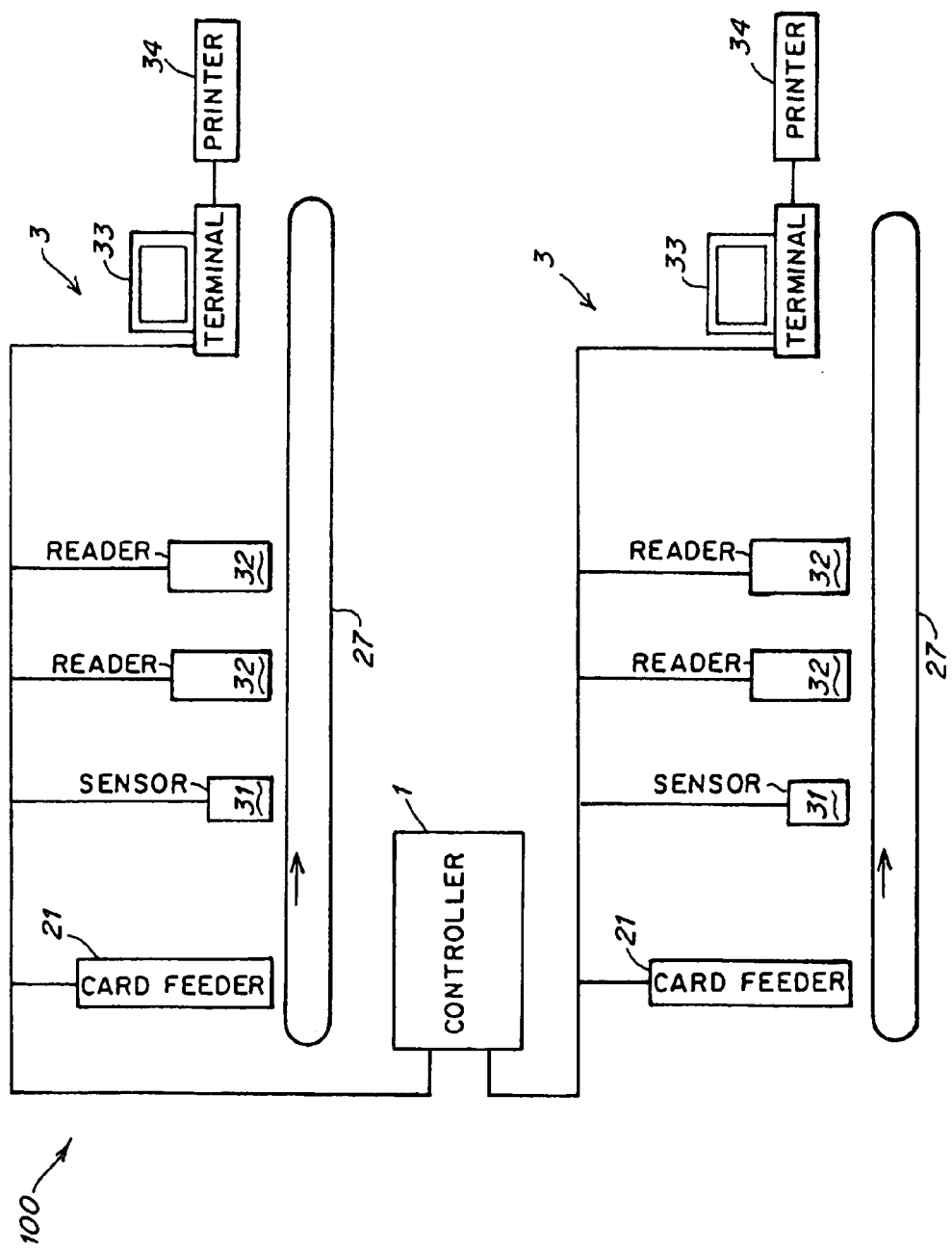
FIG. 4 is a schematic block diagram of a second embodiment in accordance with the invention.

FIG. 4 shows a second illustrative embodiment in accordance with the invention. In this illustrative embodiment, a transaction card fabrication control system 100 includes two verification stations 3 that communicate with a central controller 1, but it should be understood that the system 100 may have any suitable number of verification systems 3, such as one or more systems 3. Unlike the FIG. 1 embodiment, in this embodiment previously fabricated cards may be provided to each verification station 3 at some time after the cards are output by a manufacturing apparatus 2. Thus, the system 100 in FIG. 4 may allow the integrity of card sets to be verified where the cards are manufactured off-site, or at some time in the past by a manufacturing apparatus not directly associated with the verification systems 3. The FIG. 4 embodiment does not require the verification system 3 to process cards at a same rate that the manufacturing apparatus 2 produces cards. For example, a manufacturing apparatus 2 may output cards at a rate of 10,000 cards/hour or higher. By having verification systems 3 disassociated from the manufacturing apparatus 2, the verification systems 3 may operate at a lower or higher processing rate. In addition, having multiple verification systems 3 operating under a central controller 1 allows the information produced by each verification system 3 to be integrated together, if necessary, when multiple verification systems 3 are verifying the integrity of card sets for a same group of cards. Alternately, the verification systems 3 may verify the integrity of card sets for different card groups while having the verification information compiled at a central location. Thus, two or more different types of cards may be simultaneously processed by the verification systems with the information produced by the systems being provided to one or more controllers 1.

Although the verification stations 3 may be arranged in any suitable way, in this illustrative embodiment, each verification station 3 includes a card feeder 21 into which fabricated cards are provided. For example, a sleeve of cards to be read, or re-read in the case of a detected error, may be provided to the card feeder 21. The card feeder 21 then may feed the cards onto a card transport 27 which moves the cards relative to a card sensor 31 and card readers 32. Although two card readers 32 are shown for each verification station 3 in this illustrative embodiment, e.g., to read one or more identifiers from each card, each verification station 3 may include any suitable number or type of devices to verify the unique identity of each card. The card sensors 31 may include a photoelectric eye or other sensor that detects the physical presence of the cards and may then trigger reading by the card readers 32. In addition to triggering card reading, the card sensor 31 can indicate the presence of a card when the card reader 32 failed to read an identifier or other information from a card, as discussed above. This occurrence may indicate that an improperly read or unread card is present in the set and prompt an operator to correct the situation. For example, the operator may physically inspect the unread card to determine if the card has been improperly processed during manufacture, e.g., a barcode has not been printed on the card, or if the card readers 32 simply failed to read a properly manufactured card.

Once the identifiers from cards in the sleeve have been read, a comparison of the identifiers to a stored list may be initiated, e.g., by an operator manually reading the identifiers from first and last cards in the sleeve. Of course, the identifier comparison may be performed as identifiers are being read from cards, i.e., before all of the identifiers for cards in the sleeve have been read.

Figure 5:
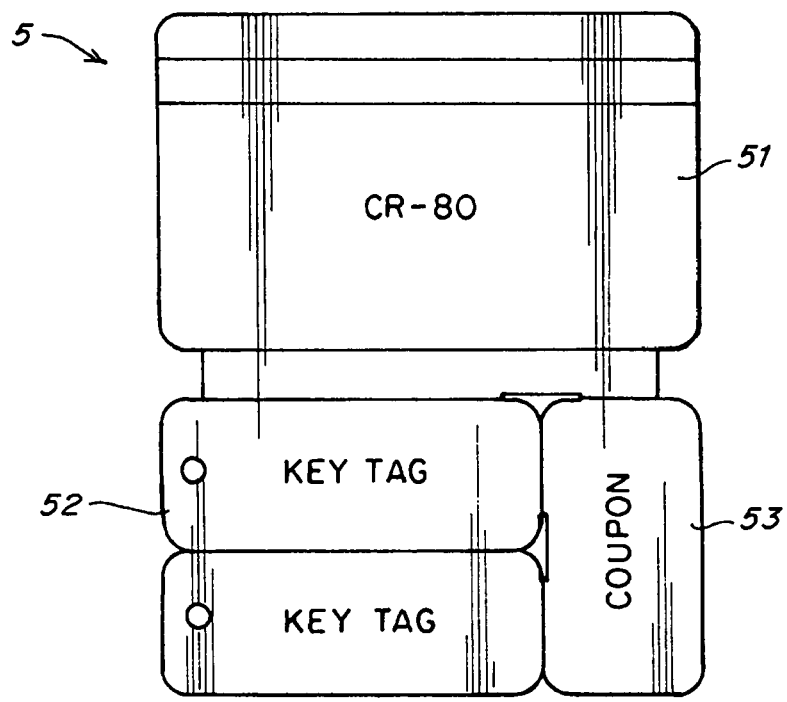
FIG. 5 shows a first embodiment of a card that may be processed by a system in accordance with the invention.
Figure 6:
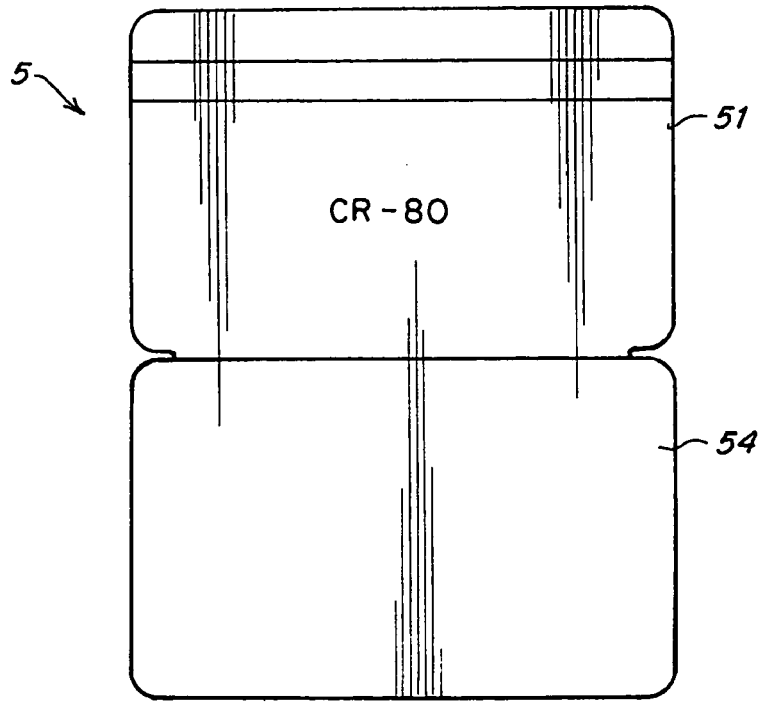
FIG. 6 is a second embodiment of a card that may be processed by a system in accordance with the invention.
Figure 7:
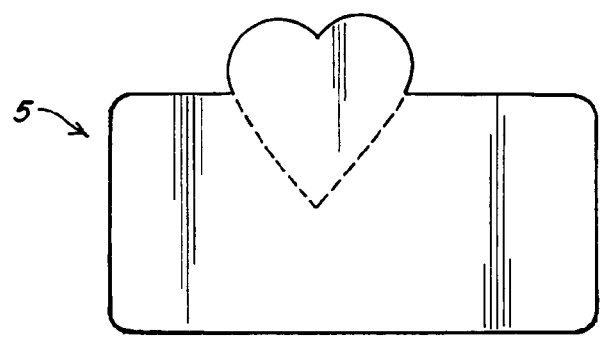
FIG. 7 is a third embodiment of a card that may be processed by a system in accordance with the invention.

The cards used with aspects of the invention are not limited in any way to a particular shape, configuration, structure, etc. For example, the manufacturing apparatus 2 (which in fact may include two or more separate machines, but is shown schematically as having one contiguous machine in FIG. 1 for simplicity) may produce cards 5 like those shown in FIGS. 5–7 or having other arrangements. In FIG. 5, the card 5 has a CR-80 portion 51 (i.e., a portion having a standard credit card size and shape), two key tag portions 52 and a coupon portion 53, i.e., the Combo™ card offered by Arthur Blank & Co. These different portions may all be formed from a single sheet of material or multiple sheets laminated together, e.g., made of PVC, that is die cut or otherwise formed into the shape shown. Scoring between the different card portions allow the portions to be separated by bending at the score line. FIG. 6 shows a different card having a CR-80 portion 51 and a top portion 54, i.e., the RAC™ card offered by Arthur Blank & Co. This card may also be formed from one or more sheets of material that are die cut to shape and scored to form a line of weakness between the CR-80 and top portions. FIG. 7 shows a custom shape card 5, in this case having a heart-like profile at the top of the card. As will be understood, the shaped portion may take any suitable form and may complement printed graphics or other information on the card.

Figure 8:
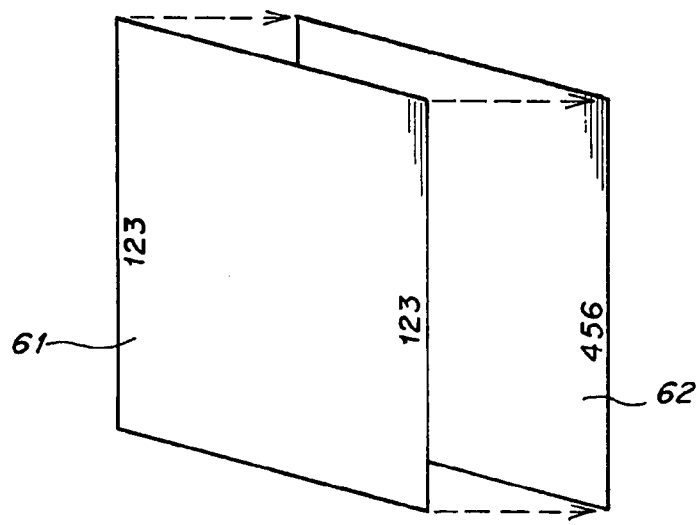
FIG. 8 shows an illustrative embodiment of two sheets to be joined to form a plurality of cards in a single laminated sheet.

It should be understood that the basic concepts behind ensuring that cards are properly fabricated discussed above may extend to areas other than personalization of the cards, i.e., providing each card or components used to make the cards with one or more unique identifiers. Although in the embodiment above the system 100 detects and reads cards after they have been manufactured, the system 100 may track cards throughout their manufacture. For example, the system 100 may ensure that cards are made using specific components to ensure that the cards are made properly. In one illustrative embodiment, cards 5 may be made from two laminated sheets of material as shown in FIG. 8. In this example, cards are made from two sheets of material—a front sheet 61 and a back sheet 62. The sheets 61 and 62 may be preprinted with graphics, text or other information on one side and then joined together in a lamination process. That is, the front sheet 61 may be printed with graphics, text, etc. for the front sides of multiple cards and the back sheet 62 may be printed with graphics, text, etc. for the back sides of multiple cards. When the sheets 61 and 62 are joined together, a single laminated sheet 63 shown in FIG. 9 may be formed that has multiple cards 5 formed on the sheet 63. The cards may then be die cut or otherwise formed from the single sheet 63.

Figure 9:
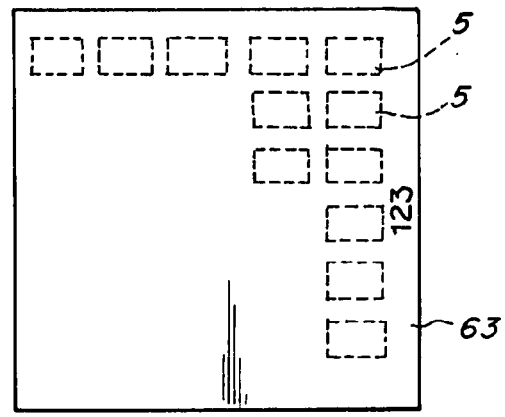
FIG. 9 shows a laminated sheet including a plurality of cards.

One concern in some manufacturing processes is that the appropriate front and back sheets 61 and 62 be joined together to make cards 5. For example, one set of sheets 61 and 62 may be printed with graphics and text suitable for $10 prepaid phone cards, while another set of sheets 61 and 62 may be printed with graphics and text suitable for $5 prepaid phone cards. If the front sheets 61 for the $10 phone cards are mistakenly laminated to the back sheets 62 of $5 phone cards, the laminated sheets may have to be discarded and remade, or worse yet, cards having inconsistent information on the front and back may be shipped to the customer. This type of complication is commonly referred to generically as "mixing lots", i.e., manufacturing two or more different card types (whether for the same or different customers) at the same time using the same equipment or facility. The system 100 may track card manufacture from early in the process to help avoid such manufacturing problems. For example, the sheet 63 in FIG. 9 is made from a front sheet 61 having a marking "123" that is joined to a back sheet 62 having a marking "456" as shown in FIG. 8. Therefore, to ensure that the appropriate front and back sheets are joined to make the cards, a barcode or other feature on the front and back sheets 61 and 62 may be read by the system 100 just before the sheets are laminated. If the proper front and back sheets are present, the controller 1 may allow the lamination process to proceed. Otherwise, an error notice may be given, requiring operator correction. The controller 1 may store this information for each sheet or card, e.g., the identifiers for components used to make the card, so any later detected errors can be traced back to the source. It should be understood that these general principles can be extended to other portions of the manufacturing processing, such as when associating computer chips, holograms or other devices or processes with particular cards or sets of cards. Such comprehensive tracking can provide for higher assurance that cards are properly made from start to finish, including personalization of the cards.

Figure 10:
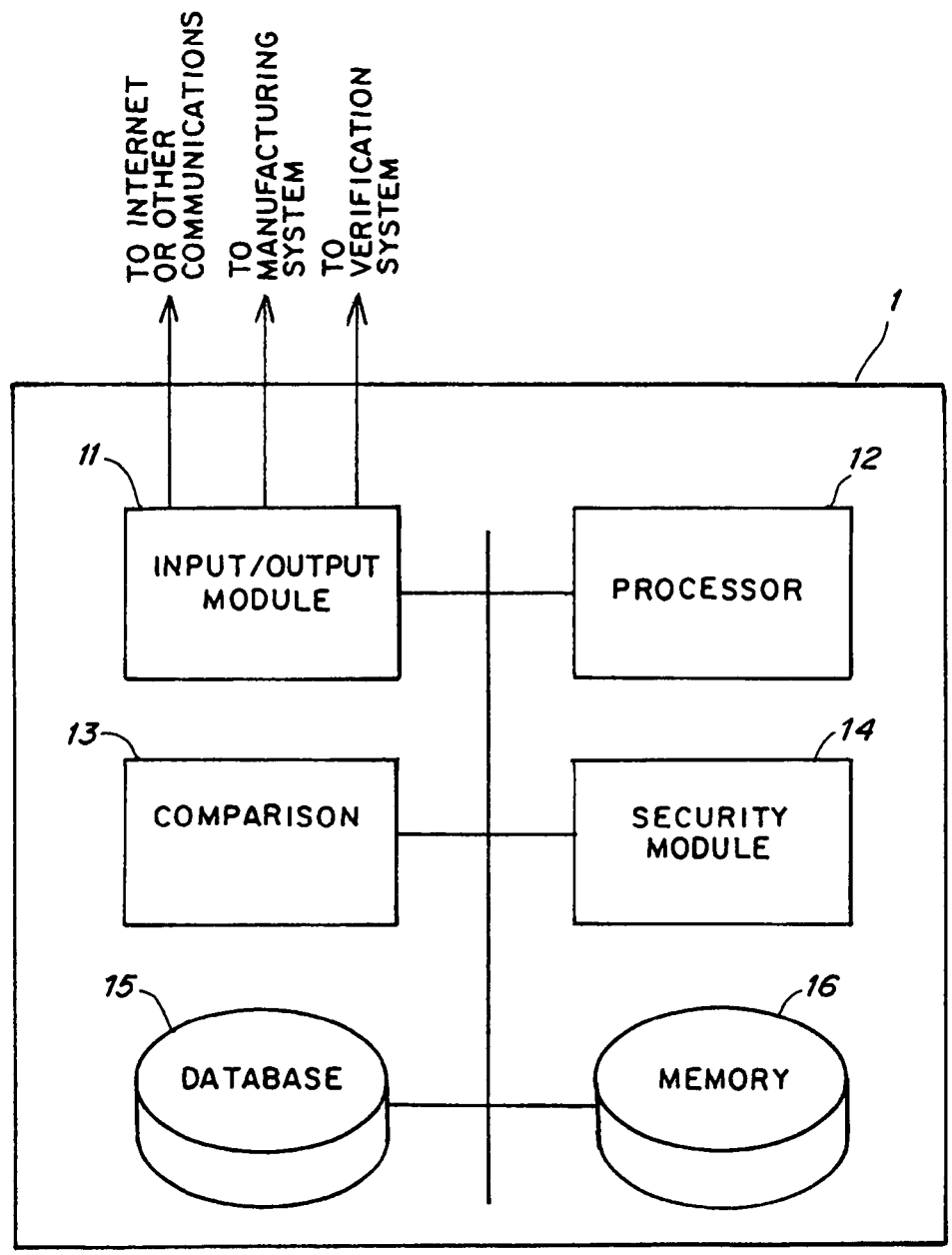
FIG. 10 is a schematic block diagram of a controller in accordance with the invention.

The various functions performed by the controller 1 in the above embodiments may be implemented, at least in part, by software of any suitable design. For example, FIG. 10 shows a schematic block diagram of a controller 1 and associated software modules. In this embodiment, the controller 1 includes one or more general purpose computers running suitable software modules to perform the desired functions. Although the controller 1 may include other or additional modules than that shown in FIG. 10, in this embodiment, an input/output module 11 is used to communicate (send and receive information) with the manufacturing system 2, the verification system 3, and other devices via the Internet or other communications link.

With respect to communication with the manufacturing system 2, as was discussed above, the controller 1 may send instructions to have certain cards or sets of cards manufactured in a particular order or fashion, send the identifiers to use in manufacturing the cards, verify whether certain components are appropriate for use in constructing cards, instruct a card to be discarded or remade, etc. The controller 1 may also receive information regarding which cards or sets of cards have been made, the identifiers used, the identity of components to be used in manufacturing cards, etc.

With respect to communication with the verification system 3, the controller 1 may send instructions to begin reading cards in a particular set, indicate that a particular set of cards is complete or incomplete, instruct the printing of a label indicating that a set of cards is ready for packaging, indicate that a particular card is out of sequence/missing/a duplicate, etc. The controller 1 may receive information regarding the initiation of verification of a set of cards (e.g., identified by identifiers read manually from first and last cards in a sleeve), identifiers read from cards in a set that are used to build a temporary file, etc.

With respect to communication with other devices, the controller 1 may receive a pre-produced database for card production, such as a list of expected cards and their properties or a list of cards with their corresponding identifiers and packaging hierarchy information (e.g., which bundle, sleeve, box, pallet each card is to be located in), video information of cards being produced, etc. The controller 1 may send information regarding a list of cards, their identifiers, packaging hierarchy, etc. so that a database for using/tracking the cards can be made. For example, the controller 1 may send information to a card issuer so that the issuer can make, or have made, a database that will be used to issue, activate, track and otherwise implement a gift card system. Customers can also be advised regarding the shipping status of cards, which cards remain to be manufactured, etc.

A processor 12 may perform all or most of the mathematical operations, control the operation of the various modules, control dataflow, and perform other decision making for the controller 1. The comparison module 13 may perform the various functions in verifying that cards are made according to the desired arrangement, e.g., ensure cards are made using the appropriate components, that no duplicate or missing cards are present in a group, that cards are ordered in a specific sequence, that cards are packaged appropriately, etc. The comparison module 13 may use a database 15 to perform its various functions. For example, if a pre-produced database is provided to the controller 1 for manufacturing and verification purposes, the pre-produced database may be stored in the database 15. The controller 1 may then use the database 15 to control manufacturing of the cards, and as cards are read by the verification system 3, the comparison module 13 may create temporary files of identifiers read from cards each particular sleeve or other set. These temporary files may be stored in the database 15 or other memory 16, and used by the comparison module 13 to compare the read identifiers to identifiers in the stored list in the database 15. If the comparison indicates that there are no unexpected, missing or duplicate cards, that cards are in a desired sequence, etc., the comparison module 13 may so indicate to the processor 12, which may output suitable instructions, such as to print a label indicating that a sleeve is complete for shipment. If a pre-produced database is not used, the comparison module 13 may generate and update a database of identifiers, packaging information, and other information to verify and store the organization of cards as they are produced and/or packaged.

A security module 14 may be used to control who has access to various aspects of the system. For example, certain production line workers may be given access to initiate sleeve reading and verification, but not given access to correct errors in the verification process, the database or other stored information. Managers and other selected personnel may be given higher level access to correct detected errors, such as authorization to initiate a re-read of a sleeve after a detected error has been corrected or instruct that a particular card be remade. However, these managers and others may not be given access to change information in the database, such as the correspondence between identifier(s) and its place in a packaging hierarchy, a shipping status of cards, etc. This access may be reserved to very few employees so that the integrity of the organization of cards in the packaging hierarchy can be ensured. The security module 14 can also be used to associate video or other surveillance of card manufacture with each card so that errors or defects in the manufacture can be identified. For example, the security module 14 may associate stored video in the memory 16 with each card's processing so if an error in producing a card is detected, the cause may be determined from a review of the associated portion of stored video.

Aspects of the invention may be used with various types of manufacturing systems 2, such as the one described in U.S. application Ser. No. 09/965,440, filed Sep. 27, 2001. This application discloses a manufacturing system that processes transaction cards in serial fashion so a transaction card enters and completes processing before a next transaction card begins processing. Thus, actual processing of another transaction card is not begun by the system until processing of a previous card is completed. In this way, the system can make a set of transaction cards in a particular order even if errors occur in making one or more transaction cards. In one illustrative embodiment, transaction cards are moved along a path past one or more item altering devices, such as an encoder or a printer, that perform operations on the transaction cards, and sensors that sense information representing whether the operations, e.g., encoding and printing, have been performed properly on a card. If the operation has not been performed properly, e.g., an identifier has not been properly encoded in a magnetic stripe, processing of the next transaction card will not begin. Instead, the improperly made card can be remade so the sequence in which cards are output by the system may be preserved. Combining this type of system with illustrative embodiments of the invention may provide an overall system that more reliably produces and verifies card sets that are complete and in a proper sequence.

As mentioned above, transaction cards used with the invention may be formed in any suitable way using any suitable processes in accordance with the invention. For example, the manufacturing apparatus 2 may form holographic information on the cards, encode or otherwise provide information to an electronic chip (by wired or wireless signal) or other device associated with each card (such as in the case with electronic cash cards), may mark the cards with biometric information (such as fingerprint, iris, or other information associated with an authorized user of the card), or otherwise process the cards. In addition, the transaction cards need not necessarily have the commonly-known credit card shape (also know as a CR80 shape), but instead may have any suitable shape and any suitable number of interconnected components. For example, each card may include a CR80 portion with attached keytags, coupon tags, or other portions. Portions of the card may be perforated, scored or otherwise formed so that the various portions may be separated from each other. Transaction cards may be made of plastic or paper sheets of material or any other suitable material.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

The invention claimed is:

1. A transaction card fabrication control system comprising:
  a card reader that reads an identifier from a plurality of transaction cards in a group, the identifier uniquely identifying each transaction card from other transaction cards in the group and useable in facilitating an association of a transaction involving each transaction card with an issuee;
a card transport that moves transaction cards relative to the card reader;
a card presence sensor that detects the presence of transaction cards moved by the card transport; and
a controller that compares identifiers read from a set of transaction cards by the card reader to a stored list of identifiers for the transaction cards and generates an approval report to release the set of transaction cards for packaging only if all identifiers read from the set of transaction cards match corresponding identifiers in the stored list.

2. The system of claim 1, wherein the controller generates an approval report only if the identifiers read from the set of transaction cards match corresponding identifiers in the stored list and if the identifiers were read from the set of transaction cards in a sequence that matches a sequence in the stored list.

3. The system of claim 1, wherein the controller builds a temporary file of identifiers read from the set of transaction cards, inserts the temporary file into a database, and compares the identifiers in the temporary file to identifiers in the stored list.

4. The system of claim 1, wherein the approval report includes a printed form that indicates the transaction cards in the set all have identifiers matching a stored list of identifiers.

5. The system of claim 1, wherein the group of transaction cards is logically organized into a plurality of sets of transaction cards, the controller stores a plurality of lists of identifiers each corresponding to an associated set of transaction cards, and compares identifiers read from sets of transaction cards to a corresponding stored list of identifiers to determine if transaction cards in the set have identifiers that match corresponding identifiers in the stored list.

6. The system of claim 1, wherein the card presence sensor causes the card reader to read transaction cards.

7. The system of claim 1, wherein the plurality of transaction cards in the group is logically organized into sets of transaction cards, and the card reader reads contiguous sets of transaction cards.

8. The system of claim 7, wherein the controller further includes a manually operated card reader, and the controller initiates a comparison of identifiers read from transaction cards in a set to the stored list of identifiers when identifiers from a first transaction card and a last transaction card in the set are read using the manually operated card reader.

9. The system of claim 8, wherein the controller is adapted to indicate if a transaction card in the set has been misread, prompt an operator to reread the misread transaction card using the manually operated card reader, and receive a reread identifier from the manually operated card reader.

10. The system of claim 9, wherein the controller is adapted to compare the reread identifier to the stored list of identifiers to determine if the misread transaction card is appropriately located in the set.

11. The system of claim 7, wherein the controller further includes a transaction card counter that is adapted to count a number of transaction cards in the set.

12. The system of claim 7, wherein the sets of transaction cards are sleeves of transaction cards.

13. The system of claim 12, wherein the controller stores information regarding identification of boxes into which sleeves are packaged, and stores information regarding identification of pallets on which boxes are packaged.

14. The system of claim 1, wherein the controller is adapted to store information regarding identifiers read from transaction cards that do not appropriately match identifiers in the stored list.

15. The system of claim 1, wherein the stored list of identifiers includes information regarding a packaging hierarchy in which the transaction cards are to be packaged.

16. The system of claim 15, wherein the stored list of identifiers includes information regarding in which sleeve each transaction card is to be packaged.

17. The system of claim 16, wherein the stored list of identifiers includes information regarding at least one of a box in which each sleeve is to be packaged, a pallet on which each box is to be packaged, and a card read status for each transaction card.

18. A method for controlling transaction card fabrication, comprising:
providing a group of fabricated transaction cards each having at least one identifier formed on the card that uniquely identifies the card from others in the group of transaction cards, the group of transaction cards being logically organized into a plurality of sets of transaction cards;
reading identifiers from the plurality of sets of transaction cards;
comparing identifiers read from transaction cards in each set to a stored list of identifiers associated with the set;
determining if the identifiers read from transaction cards in each set match corresponding identifiers in the stored list associated with the set;
generating a report that indicates a set is complete if all identifiers read from the set match a corresponding identifier in the associated stored list; and
generating a report that indicates a set is incomplete if at least one identifier read from the set does not match a corresponding identifier in the associated stored list.

19. The method of claim 18, wherein the step of comparing identifiers comprises comparing the identifiers in a sequence in which the identifiers were read from the transaction cards in the set to a sequence of identifiers in the stored list.

20. The method of claim 18, wherein the step of reading identifiers from the plurality of sets of cards comprises building a temporary file of identifiers read from each set of cards, and the step of comparing identifiers comprises inserting the temporary file into a database and comparing identifiers in the temporary file to the stored list associated with each set after all transaction cards in the set have been read.

21. The method of claim 18, wherein the step of reading identifiers comprises reading identifiers from contiguous sets of transaction cards.

22. The method of claim 18, further comprising manually reading identifiers from a first transaction card and a last transaction card in a set of transaction cards, and initiating the step of comparing identifiers read from transaction cards in the set in response to manually reading the identifiers from the first and last transaction cards in the set.

23. The method of claim 18, further comprising indicating to an operator if a transaction card in a set has been misread to prompt the operator to reread the misread transaction card.

24. The method of claim 23, further comprising comparing the reread identifier to the stored list of identifiers to determine if the misread transaction card is appropriately located in the set.

25. The method of claim 18, further comprising counting the total number of transaction cards in each set of transaction cards using a counter that detects whether an appropriate number of cards is present in the set of transaction cards.

26. The method of claim 18, wherein the sets of transaction cards are sleeves of transaction cards.

27. The method of claim 26, further comprising storing information regarding identification of boxes into which sleeves are packaged, and storing information regarding identification of pallets on which boxes are packaged.

28. The method of claim 18, wherein the step of generating a report that indicates a set is incomplete comprises storing information regarding identifiers read from transaction cards that do not appropriately match identifiers in the stored list.

29. The method of claim 18, wherein the stored list of identifiers includes information regarding a packaging hierarchy in which the transaction cards are to be packaged.

30. The method of claim 29, wherein the stored list of identifiers includes information regarding in which sleeve each transaction card is to be packaged.

31. The method of claim 30, wherein the stored list of identifiers includes information regarding at least one of a box in which each sleeve is to be packaged, a pallet on which each box is to be packaged, and a card read status for each transaction card.

32. The method of claim 18, wherein the step of generating a report that indicates a set is complete comprises printing a label for the set that indicates the set is complete and physically associating the label with a container in which the set of transaction cards is located.

33. The method of claim 32, wherein the step of generating a report that indicates a set is complete comprises providing a tamper-evident seal on a container holding the set of transaction cards.

34. A method for controlling transaction card fabrication, comprising:
(a) providing a group of fabricated transaction cards, each transaction card having at least one identifier formed on the transaction card that uniquely identifies the transaction card from others in the group of transaction cards;
(b) machine reading identifiers from a set of the transaction cards, the set of transaction cards having 5 or more transaction cards and less than a total number of transaction cards in the group;
(c) physically organizing the set of transaction cards to be separately packaged from other sets of transaction cards;
(d) storing the identifiers read from the corresponding set of transaction cards;
(e) repeating steps (b) through (d) for subsequent sets of transaction cards;
(f) comparing the identifiers read from the sets to a stored list of identifiers; and
(g) automatically identifying if any transaction cards in the sets are unexpected or duplicates or if there are any missing transaction cards based on the comparison of step (f).

35. The method of claim 34, wherein the step of comparing identifiers comprises comparing the identifiers in a sequence in which the identifiers were read from a set of transaction cards to a sequence of identifiers in the stored list.

36. The method of claim 34, wherein the stored list of identifiers is established before any transaction card in the group of transaction cards is machine read.

37. The method of claim 34, wherein the stored list of identifiers is empty before any transaction card in the group of transaction cards is machine read, and the step (d) of storing identifiers comprises adding the identifiers read from the corresponding set of transaction cards to the stored list of identifiers.

38. The method of claim 37, wherein the step (f) of comparing identifiers comprises comparing identifiers from a set of transaction cards to identifiers from previously read transaction cards in the stored list.

39. The method of claim 34, wherein the step (f) of comparing identifiers comprises manually reading identifiers from a first transaction card and a last transaction card in a set of transaction cards, and initiating a comparison of identifiers read from the set of transaction cards to identifiers in the stored list in response to manually reading the identifiers from the first and last transaction cards in the set.

40. The method of claim 34, further comprising indicating to an operator if a transaction card in a set has been misread to prompt the operator to manually reread the misread transaction card.

41. The method of claim 40, further comprising comparing the reread identifier to the stored list of identifiers to determine if the misread transaction card is appropriately located in a set.

42. The method of claim 34, further comprising counting the total number of transaction cards in each set of transaction cards using a counter that detects the presence of cards.

43. The method of claim 34, wherein the sets of transaction cards are sleeves of transaction cards.

44. The method of claim 43, further comprising storing information regarding identification of boxes into which sleeves are packaged, and storing information regarding identification of pallets on which boxes are packaged.

45. The method of claim 34, wherein the step (g) of automatically identifying comprises generating a report that indicates a set is incomplete.

46. The method of claim 34, wherein the stored list of identifiers includes information regarding a packaging hierarchy in which the transaction cards are to be packaged.

47. The method of claim 46, wherein the stored list of identifiers includes information regarding in which sleeve each transaction card is to be packaged.

48. The method of claim 47, wherein the stored list of identifiers includes information regarding at least one of a box in which each sleeve is to be packaged, a pallet on which each box is to be packaged, and a card read status for each transaction card.

49. The method of claim 34, further comprising generating a report that indicates a set is complete by printing a label for the set that indicates the set is complete and physically associating the label with a container in which the set of transaction cards is located.

50. The method of claim 49, wherein the step of generating a report that indicates a set is complete comprises providing a tamper-evident seal on a container holding the set of transaction cards.

51. The method of claim 34, wherein the stored list of identifiers includes two identifiers for each transaction card, each transaction card in the group having a unique association of two identifiers formed on the card.

52. A method for processing transaction items, comprising:
(a) moving a first transaction card along a path;
(b) performing a first operation on the first transaction card that alters the first transaction card, the first operation, when properly performed, forming information on the first transaction card and causing the first transaction card to be uniquely identified from other transaction cards in a group of processed transaction cards;

(c) detecting information indicative of whether the first operation was properly performed on the first transaction card;

(d) automatically remaking the first transaction card if the first operation was improperly performed on the first transaction card before making a next transaction card so that the set of processed transaction cards is created in a specific sequence;

(e) repeating steps (a) through (d) so as to provide a group of transaction cards, each transaction card having at least one identifier formed on the transaction card that uniquely identifies the transaction card from others in the group of transaction cards;

(f) machine reading identifiers from a set of the transaction cards, the set of transaction cards having 5 or more transaction cards and less than a total number of transaction cards in the group;

(g) physically organizing the set of transaction cards to be separately packaged from other sets of transaction cards;

(h) storing the identifiers read from the corresponding set of transaction cards;

(i) repeating steps (f) through (h) for subsequent sets of transaction cards;

(j) comparing the identifiers read from the sets to a stored list of identifiers; and (k) automatically identifying if any transaction cards in the sets are duplicates or if there are any missing transaction cards based on the comparison of step (j).

* * * * *